(12) United States Patent
Nix

(10) Patent No.: US 9,884,729 B1
(45) Date of Patent: Feb. 6, 2018

(54) SPRING RETAINER FOR HIGH ANGLE CONVEYOR

(71) Applicant: Joy MM Delaware, Inc., Wilmington, DE (US)

(72) Inventor: Stevie Kim Nix, Winfield, AL (US)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 15/380,901

(22) Filed: Dec. 15, 2016

(51) Int. Cl.
*B65G 15/14* (2006.01)
*B65G 39/14* (2006.01)
*B65G 15/16* (2006.01)
*F16F 15/04* (2006.01)
*F16M 13/02* (2006.01)

(52) U.S. Cl.
CPC ............ *B65G 39/14* (2013.01); *B65G 15/16* (2013.01); *F16F 15/04* (2013.01); *F16M 13/02* (2013.01); *F16F 2238/026* (2013.01)

(58) Field of Classification Search
CPC .. B65G 15/14; B65G 15/18; B65G 2201/042; B65G 2201/045
USPC ............................ 198/626.4, 626.6, 819, 821
See application file for complete search history.

(56) References Cited

U.S. PATENT DOCUMENTS

| | | | |
|---|---|---|---|
| 2,695,701 A * | 11/1954 | Hagenbook | B65G 39/14 198/826 |
| 4,099,712 A | 7/1978 | Martin | |
| 4,214,744 A | 7/1980 | Evans | |
| 4,433,774 A | 2/1984 | Lopes | |
| 4,561,537 A | 12/1985 | Dos Santos | |
| 4,564,189 A | 1/1986 | Noll, Jr. | |
| 4,609,097 A | 9/1986 | Dos Santos | |
| 5,165,314 A | 11/1992 | Paulson et al. | |
| 5,193,423 A | 3/1993 | Bakker | |
| 5,320,471 A | 6/1994 | Grathoff | |
| 5,875,697 A * | 3/1999 | Cole | B65G 15/14 198/626.4 |
| 6,264,022 B1 * | 7/2001 | Petack | B65G 15/16 198/626.4 |
| 6,484,870 B2 | 11/2002 | Bohnker et al. | |

(Continued)

FOREIGN PATENT DOCUMENTS

| RU | 2184693 C2 | 7/2002 |
|---|---|---|
| RU | 2455216 C2 | 7/2012 |

OTHER PUBLICATIONS

"Sandwich Conveyors—Functional Description", http://www.ckit.co.za/secure/conveyor/sandwich/sandwich_basics_funcdescript.html, (2015), 3 pages, C-KIT.

(Continued)

*Primary Examiner* — James R Bidwell
(74) *Attorney, Agent, or Firm* — Michael Best & Friedrich LLP

(57) ABSTRACT

A high angle conveyor includes a frame, a lower conveyor belt, an upper conveyor belt, and a pressing assembly. The pressing assembly includes a bracket coupled to the frame, a roller supported on the bracket, a spring support coupled to the frame, a spring positioned between the bracket and the spring support, and a spring retainer coupling the spring to at least one selected from the group of the frame, the bracket, and the spring support. The spring urges the bracket and the roller toward the upper conveyor belt such that the pressing assembly biases the upper conveyor belt toward the lower conveyor belt.

16 Claims, 7 Drawing Sheets

(56) References Cited

U.S. PATENT DOCUMENTS 6,626,283 B2 * 9/2003 McBride ............ B65G 15/14
                                                198/626.6
6,793,454 B2    9/2004 Brizzi
2015/0075207 A1 3/2015 Karikusa et al.

OTHER PUBLICATIONS

"Spring Tension Support on Conveyor Belt: How to Build a Conveyor Belt, How to Make a Mini Conveyor Belt, How to Make a", http://www.wcre.us/conveyor_plant/3314.html, (2015), 9 pages, Conveyor Company, Beijing, China.
Dos Santos, J. A. et al., "Open-Pit Mining: Evolution of Sandwich Belt High-Angle Conveyors", Papers: Evolution of a Sandwich Belt, http://www.ckit.co.za/secure/conveyor/papers/sandwich/evolution/evolution.html, (2015), 22 pages.
"HAC System—High Angle Conveyor Product Overview", HAC System Product Overview Brochure, (2015), 3 pages. Joy Global.

* cited by examiner

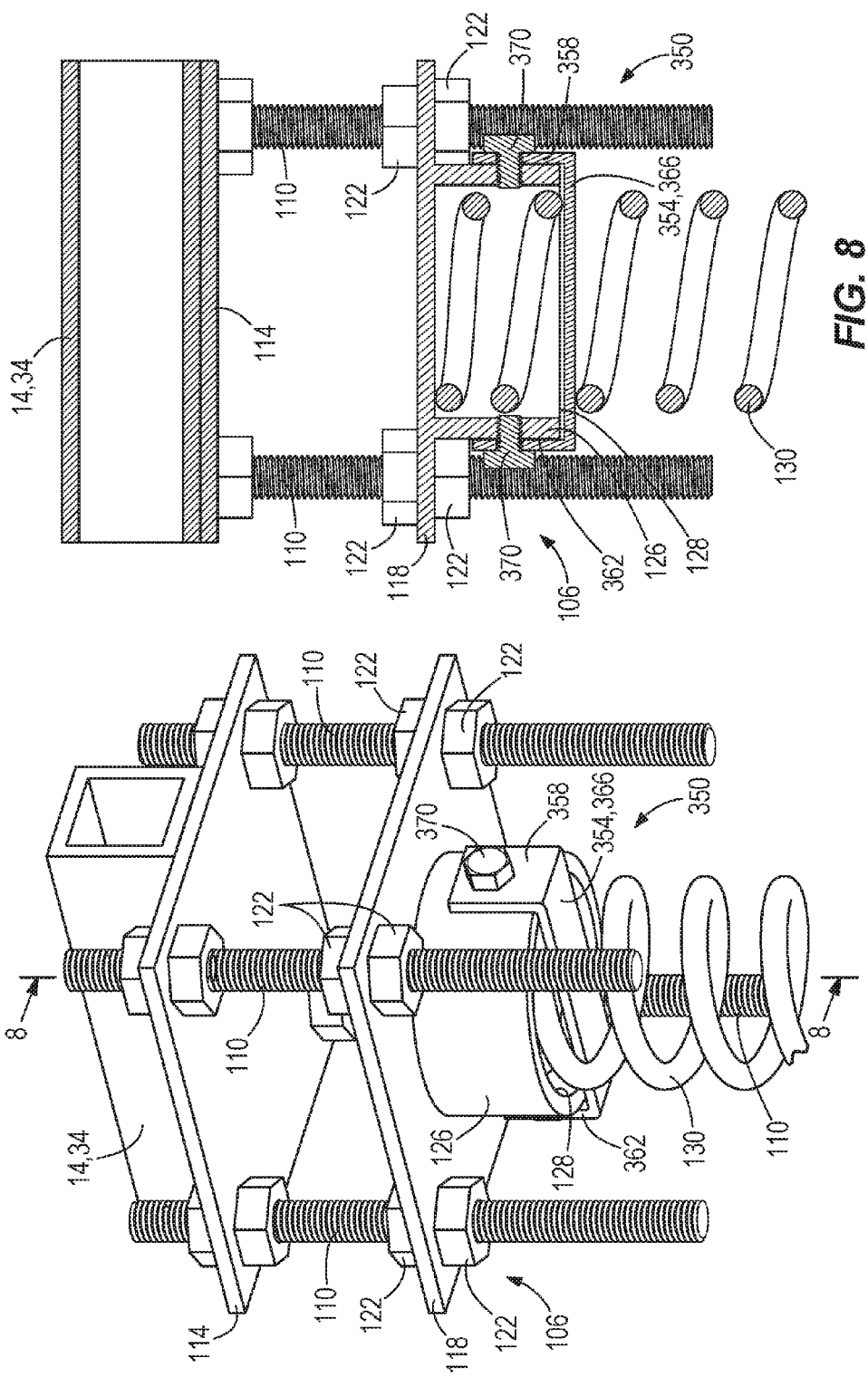

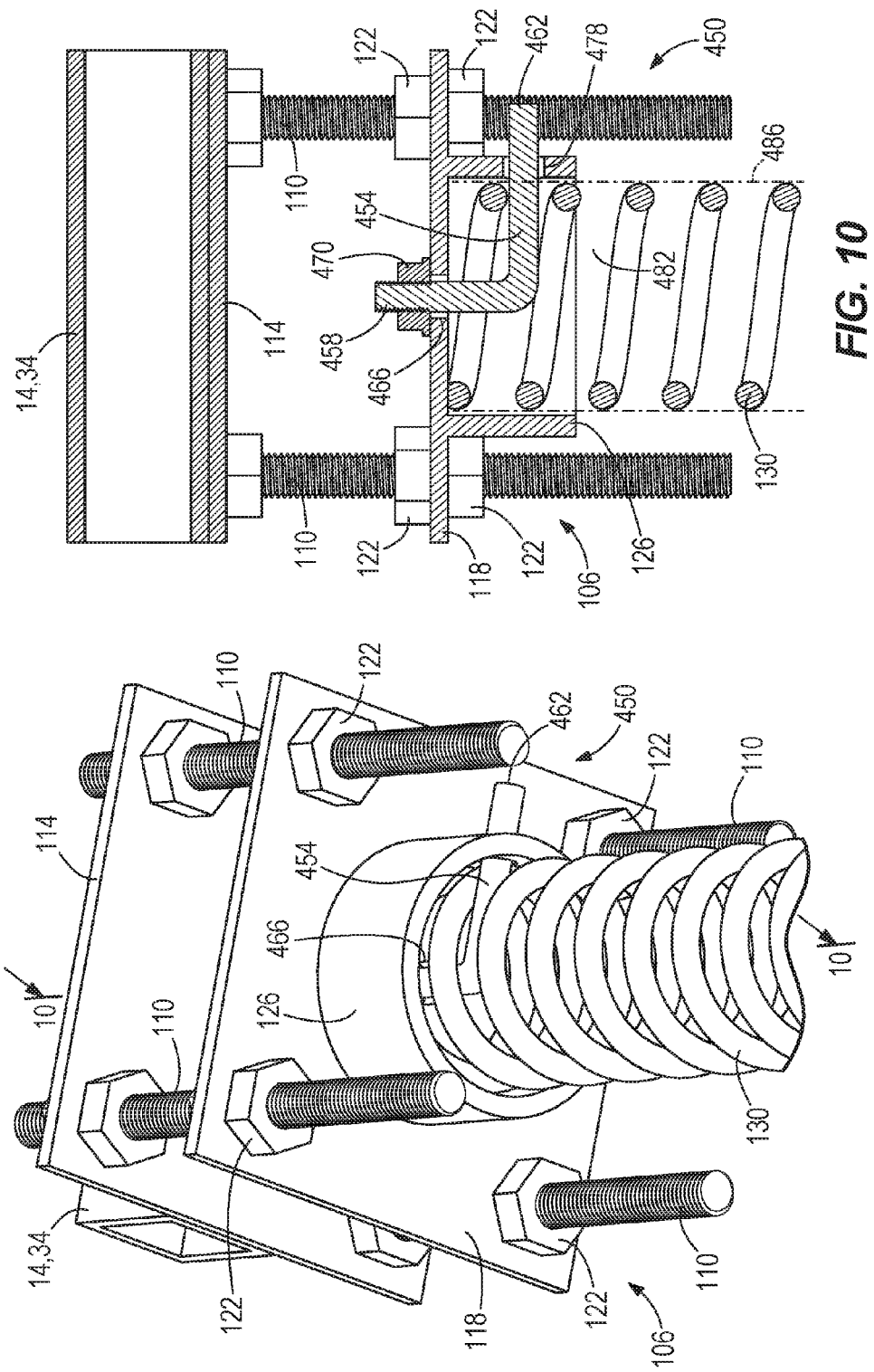

SPRING RETAINER FOR HIGH ANGLE CONVEYOR

BACKGROUND

The present invention relates to high angle conveyors and more specifically, to pressing assemblies for high angle conveyors.

SUMMARY

In one aspect, the invention provides a high angle conveyor including a frame, a lower conveyor belt, an upper conveyor belt, and a pressing assembly. The pressing assembly includes a bracket coupled to the frame, a roller supported on the bracket, a spring positioned between the bracket and the frame, and a spring retainer coupling the spring to at least one selected from the group of the frame and the bracket. The spring urges the bracket and the roller toward the upper conveyor belt such that the pressing assembly biases the upper conveyor belt toward the lower conveyor belt.

In another aspect the invention provides a pressing assembly for a conveyor including a bracket supporting a roller, a spring support, and a spring positioned between the bracket and the spring support. The pressing assembly further includes a spring retainer coupling the spring to at least one selected from the group of the bracket, and the spring support. The spring urges the bracket and the roller away from the spring support.

Other aspects of the invention will become apparent by consideration of the detailed description and accompanying drawings.

BRIEF DESCRIPTION OF THE DRAWINGS

FIG. 7 is a bottom perspective view of a portion of a pressing assembly having a spring retainer according to another embodiment of the invention.

FIG. 8 is a partial cross-sectional view of the spring retainer of FIG. 7 taken along lines 8-8 of FIG. 7.

FIG. 9 is a bottom perspective view of a portion of a pressing assembly having a spring retainer according to another embodiment of the invention.

FIG. 10 is a partial cross-sectional view of the spring retainer of FIG. 9 taken along lines 10-10 of FIG. 9.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
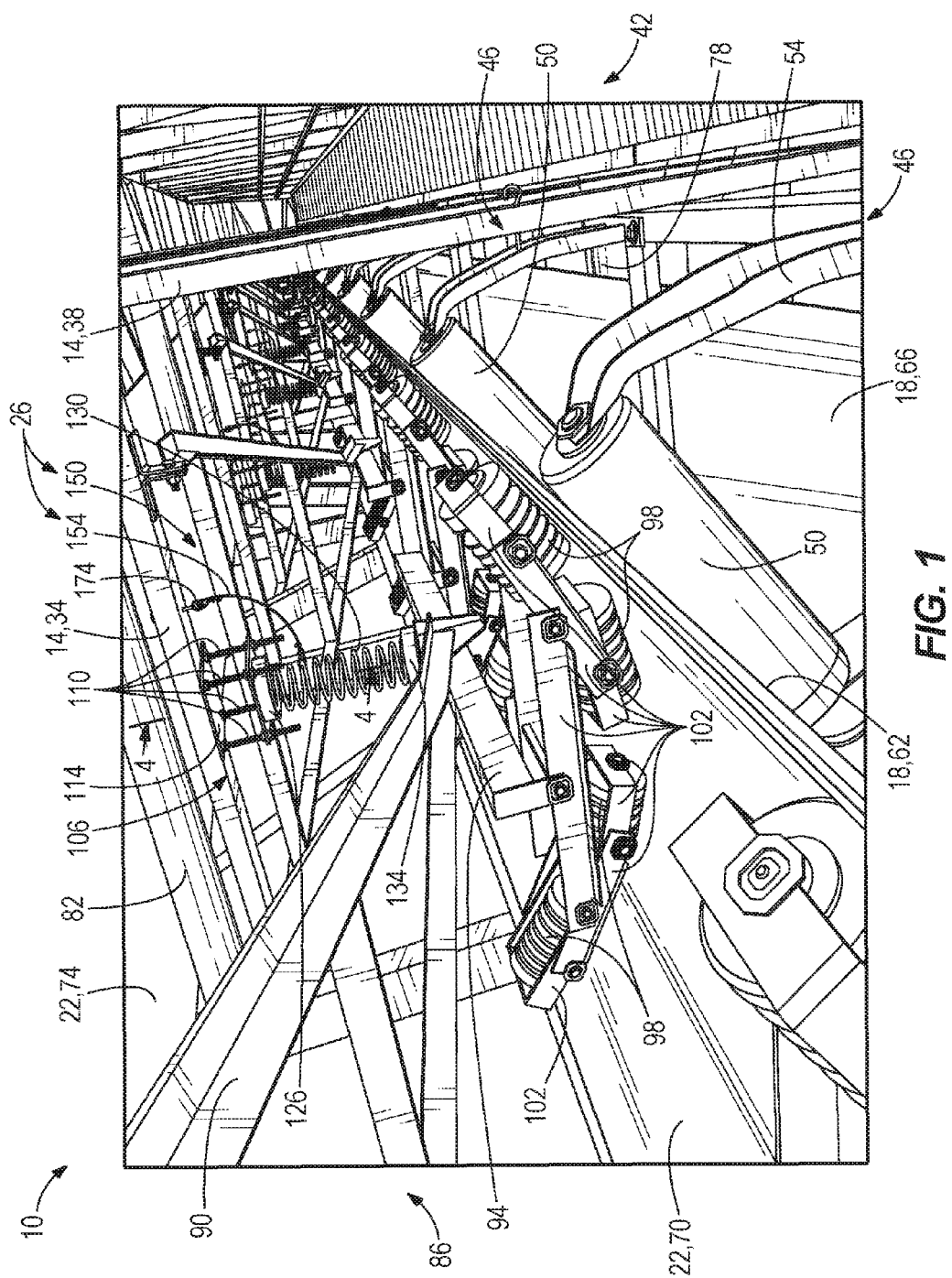
FIG. 1 is a perspective view of a high angle conveyor including pressing assemblies having a spring retainer.

With reference to FIG. 1, a high angle conveyor 10 is illustrated having a frame 14, a lower continuous conveyor belt 18, an upper continuous conveyor belt 22, and pressing assemblies 26. The lower conveyor belt 18 and the upper conveyor belt 22 are arranged in an endless sandwich configuration to conveyor material 30 (FIG. 3) between the lower and upper conveyor belts 18, 22 at large angles with respect to horizontal. For example, the high angle conveyor 10 may transport material 30 at a steep conveying angle up to 90° vertical.

Figure 2:
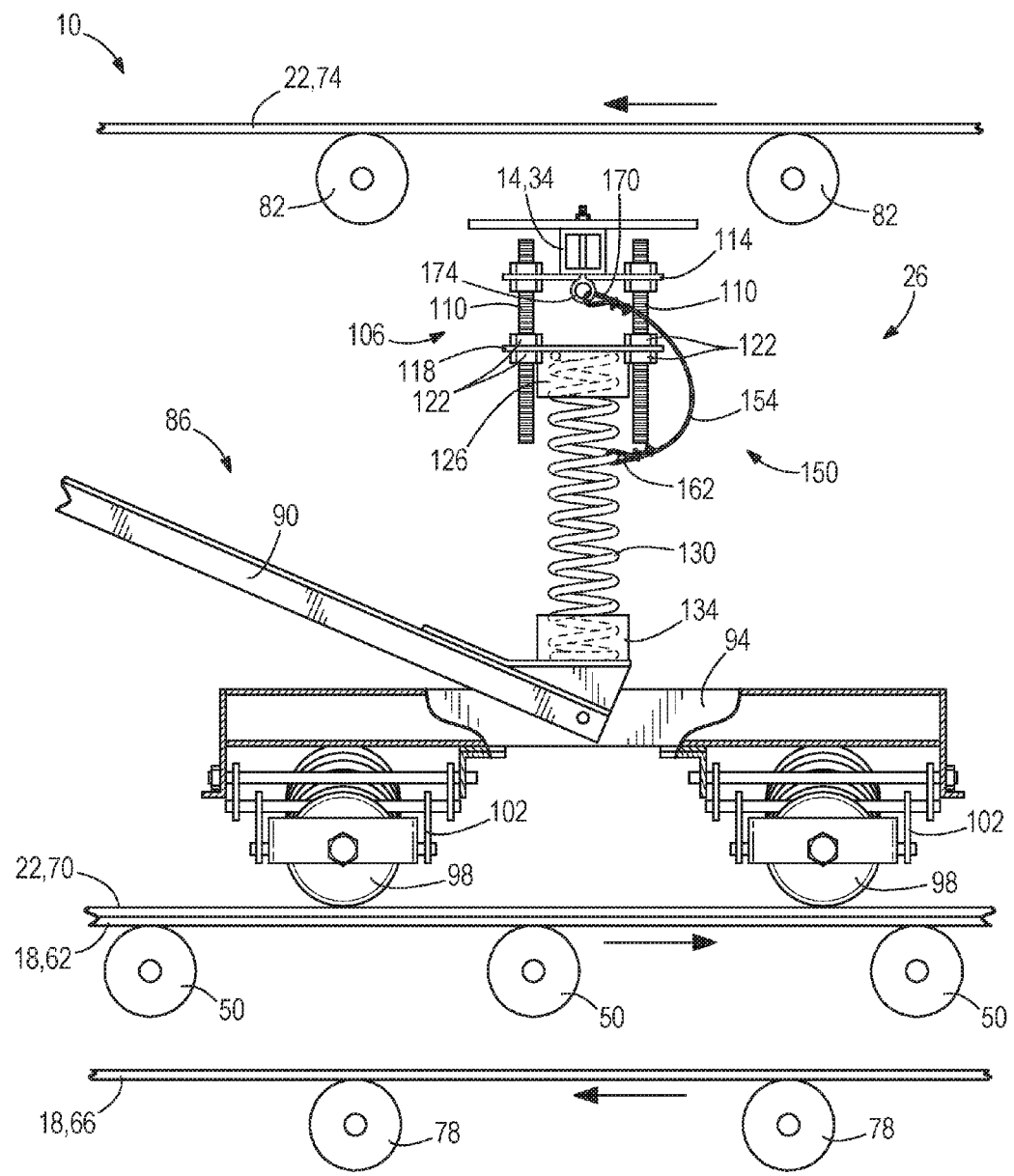
FIG. 2 is a side schematic view of one of the pressing assemblies of FIG. 1.
Figure 3:
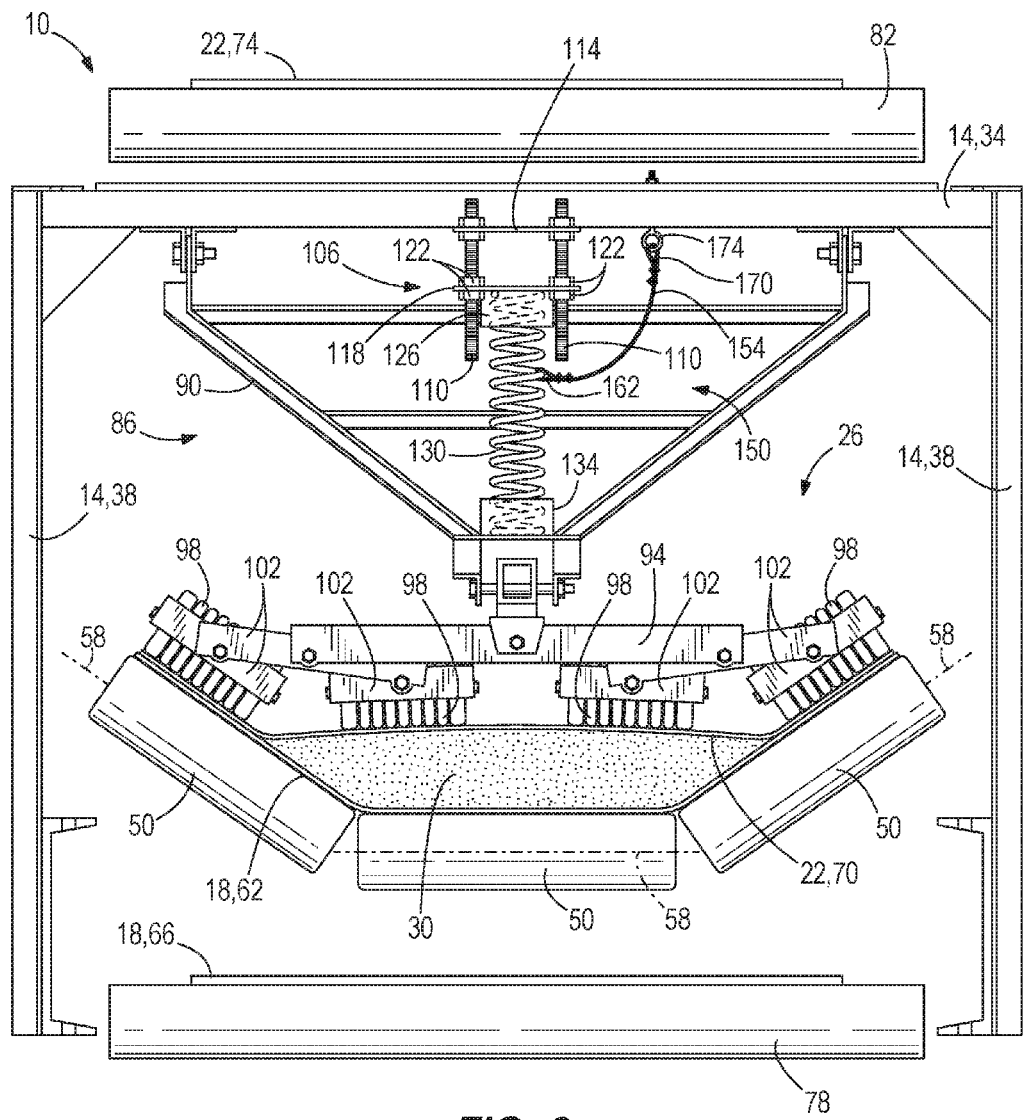
FIG. 3 is an end schematic view of one of the pressing assemblies of FIG. 1.

With reference to FIGS. 1-3, the frame 14 of the high angle conveyor 10 extends at an angle with respect to horizontal and includes top frame members 34 and side frame members 38. In some embodiments, the frame 14 may include a staircase 42 that ascends alongside the lower and upper conveyor belts 18, 22. Idler roller assemblies 46 are positioned beneath the lower conveyor belt 18. The idler roller assemblies 46 each include idler rollers 50 that are rotatable supported on an idler frame 54. In the illustrated embodiment, the idler rollers 50 in each idler roller assembly 46 are positioned such that the rotational axes 58 (FIG. 3) of the idler rollers 50 are not aligned (i.e., the idler rollers 50 rotate about axes 58 that are transverse to each other). Such an arrangement of the idler rollers 50 forms a trough shape into which the material 30 is received between the lower and upper conveyor belts 18, 22 (FIG. 3).

With reference to FIG. 2, both the lower conveyor belt 18 and the upper conveyor belt 22 are continuous conveyor belts. Specifically, the lower conveyor belt 18 includes a lower conveying belt portion 62 and a lower return belt portion 66, and the upper conveyor belt 22 includes an upper conveying belt portion 70 and an upper return belt portion 74. The lower return belt portion 66 is supported by lower belt support rollers 78. The upper return belt portion 74 is supported by upper belt support rollers 82 coupled to the frame 14.

With continued reference to FIGS. 1-3, the pressing assemblies 26 are coupled to the frame 14 and bias the upper conveyor belt 22 toward the lower conveyor belt 18, as described in further detail below. Each of the pressing assemblies 26 includes a bracket 86 pivotally coupled to the frame 14. The bracket 86 includes an A-frame 90 and a roller support 94. In the illustrated embodiment, the A-frame 90 is pivotally coupled to the frame 14 and the roller support 94 is pivotally coupled to the A-frame 90. The roller support 94 rotatably supports pressing rollers 98 that engage the upper conveyor belt 22. In the illustrated embodiment, the pressing rollers 98 are arranged in two rows (FIG. 2), with four pressing rollers 98 in each row (FIG. 3). Specifically, the roller support 94 includes linkages 102 that rotatably support the pressing rollers 98.

Each of the pressing assemblies 26 further includes a spring support 106 coupled to the frame 14. In the illustrated embodiment, the spring support 106 is secured to the top frame member 34 by, for example, a welding process. The spring support 106 includes bolts 110, an upper plate 114, and a lower plate 118 that is adjustably positioned with respect to the upper plate 114 via adjustment of nuts 122 corresponding to the bolts 110. A spring 130 is included in each of the pressing assemblies 26 and is positioned between the bracket 86 and the frame 14. In the illustrated embodiment, the spring 130 is positioned between the bracket 86 and the spring support 106.

The spring support 106 further includes a cylindrical seat 126 (i.e., an upper spring seat) extending from the lower plate 118, in which an upper end of the spring 130 is received. In the illustrated embodiment, the cylindrical seat 126 is coaxially aligned with the spring 130. Similarly, the bracket 86 of the pressing assembly 26 includes a lower cylindrical spring seat 134 in which a lower end of the spring 130 is received. In the illustrated embodiments, the spring 130 is positioned within (i.e., seated in) the cylindrical spring seats 126, 134, however, in alternative embodiments, the spring 130 may be positioned around (i.e., on the outside of) the cylindrical spring seats 126, 134 (see, for example, spring seat 126B of FIGS. 5-6). The spring 130 urges the bracket 86 and the pressing rollers 98 toward the upper conveyor belt 22 (i.e., toward the upper conveying belt portion 70 and away from the spring support 106) such that the pressing assembly 26 biases the upper conveyor belt 22 toward the lower conveyor belt 18, securing the material 30 therebetween. By adjusting the position of the lower plate 118 with respect to the upper plate 114 via the nuts 122 and the bolts 110, the amount of pre-tensioning on the spring 130 can be adjusted by an operator. In other words, the amount of compression on the spring 130 in a resting state of the pressing assembly 26 can be adjusted by repositioning the lower plate 118 with respect to the upper plate 114. In some embodiments, repositioning of the lower plate 118 is also utilized to initially assemble and position the spring 130 between the cylindrical spring seats 126, 134.

Further details regarding the structure and operation of a typical high angle conveyor can be found in U.S. Pat. No. 4,609,097 to Continental Conveyor and Equipment Company, Inc., the entire contents of which are hereby incorporated by reference.

As long as high angle conveyors operate within the manufacturer's specified capabilities, high angle conveyors functions properly and according to design. However, problems operating high angle conveyors arise when the high angle conveyor is loaded beyond its designed capacity (i.e., outside the specified capabilities). For example, in some instances a large object that exceeds the maximum lump size limits is placed between the upper and lower conveyor belts 18, 22. When a large amount of material 30 or large object is positioned between the conveyor belts 18, 22 and passes underneath the pressing assemblies 26, the spring 130 becomes over-compressed. When the spring 130 becomes over-compressed, the spring 130 is forced out of (i.e., ejected from) the upper and lower spring seats 126, 134. In other words, when the pressing assembly 26 deflects too much in order to accommodate large material 30, the spring 130 becomes compressed to such an extent that the spring force generated by the spring 130 causes the spring 130 to pop out of position (i.e., the spring 130 buckles and becomes free from the spring seats 126, 134). Having the spring 130 become free from the spring seats 126, 134 is undesired due to the potential for the spring 130 to fall large distances, causing damage and injury. This problem of the spring 130 becoming free from the spring seats 126, 134 would not have been an obvious problem to those skilled in the art because under normal operating conditions, the spring 130 is adequately held in position. As such, the problem with the spring 130 of the pressing assembly 26 becoming free due to over-compression is being raised for the first time herein along with various embodiments of the invention to solve the problem.

With reference to FIGS. 1-4, a spring retainer 150 according to a first embodiment of the invention is illustrated. The spring retainer 150 couples the spring 130 to at least one the frame 14, the bracket 86, or the spring support 106. In the illustrated embodiment, the spring retainer 150 is shown coupling the spring 130 directly to the frame 14 (i.e., the top frame member 34). The spring retainer 150 includes a cable 154 (e.g., a steel cable). The spring retainer 150 further includes a first thimble 158 at a first end 162 of the cable 154 and a second thimble 166 at a second end 170 of the cable 166. Specifically, with reference to FIG. 4, fittings 172 secure the first thimble 158 and the second thimble 166 to the cable 154. The spring retainer 150 further includes an eye bolt 174 coupled to the frame 14. In alternative embodiments, the eye bolt 174 may be any suitable fastener to which the second end 170 of the cable 154 may be secured. In further alternatives, the cable 154 may be a high strength cable with a nylon coating (e.g., an aircraft cable), a zip tie, or any other suitable cable of sufficient strength.

Figure 4:
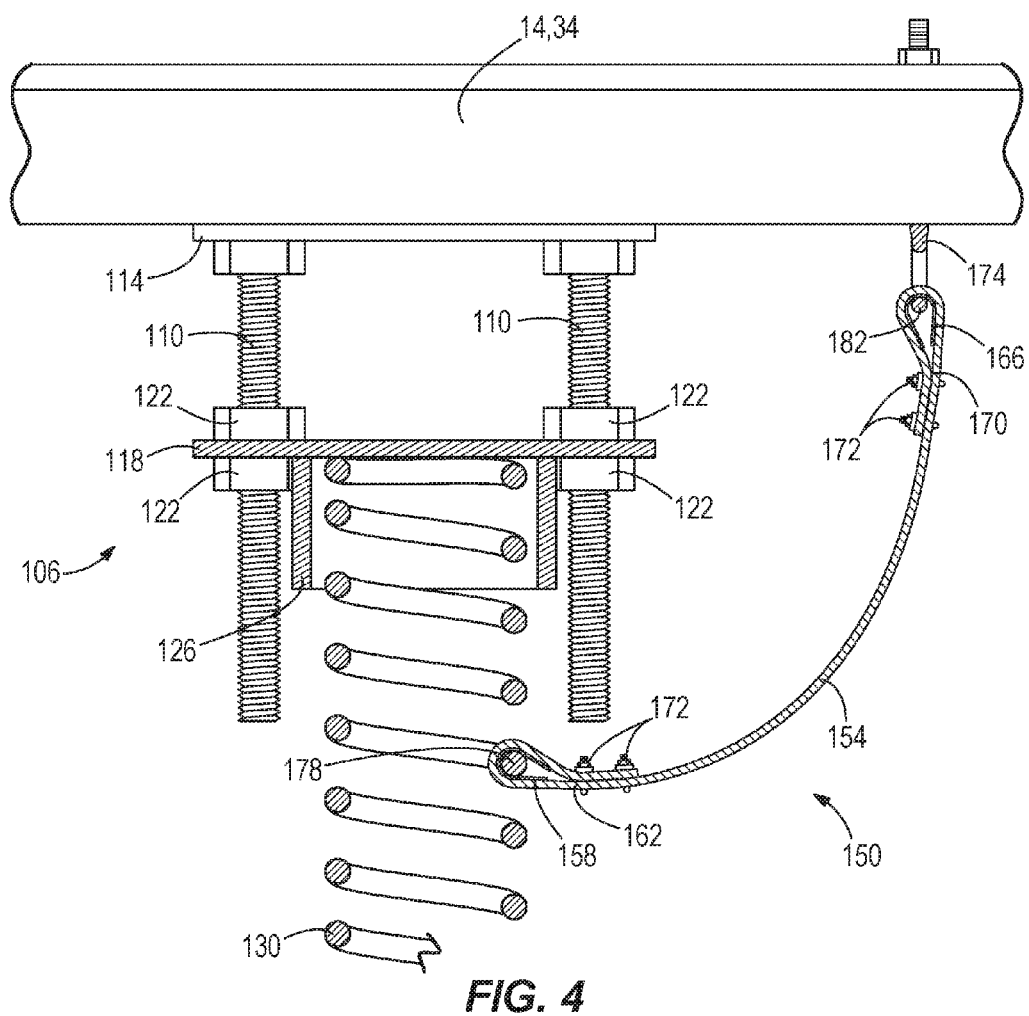
FIG. 4 is a partial cross-sectional view of the spring retainer of FIG. 1 taken along lines 4-4 of FIG. 1.

With reference to FIG. 4, the first thimble 158 is coupled to the spring 130 and the second thimble 166 is coupled to the eye bolt 174. Specifically, the first thimble 158 is positioned around a circular cross-sectional portion 178 of the spring 130 such that the first thimble 158 and corresponding cable 154 are operable to move with respect to the spring 130 without creating excessive frictional wear. Likewise, the second thimble 166 is positioned around a circular cross-sectional portion 182 of the eye bolt 174 such that the second thimble 166 and the corresponding cable are operable to move with respect to the eye bolt 174 without creating excessive frictional wear. As such, the first end 162 of the cable 154 is coupled to the spring 130 and the second end 170 of the cable 154 is coupled to the frame 14. In alternative embodiment, the second end 170 of the cable 154 is coupled to any suitable stationary structure around the spring 130. For example, in further alternative embodiments, the second end 170 of the cable 154 is coupled to either the bracket 86 or the spring support 106.

As a result of the spring retainer 150, the spring 130 is constrained to the location surrounding the spring support 106 and bracket 86. As such, should the spring 130 become free from the upper and lower spring seats 126, 134 due to excessively large material passing through the high angle conveyor 10, the spring 130 will stay secured to the remainder of the high angle conveyor 10 by the spring retainer 150. In this way, the spring 130 will not free fall but is rather secured (i.e., anchored) to the area immediately surrounding the spring 130 (i.e., the frame 14, the spring support 106, the bracket 86, etc.).

Figure 6:
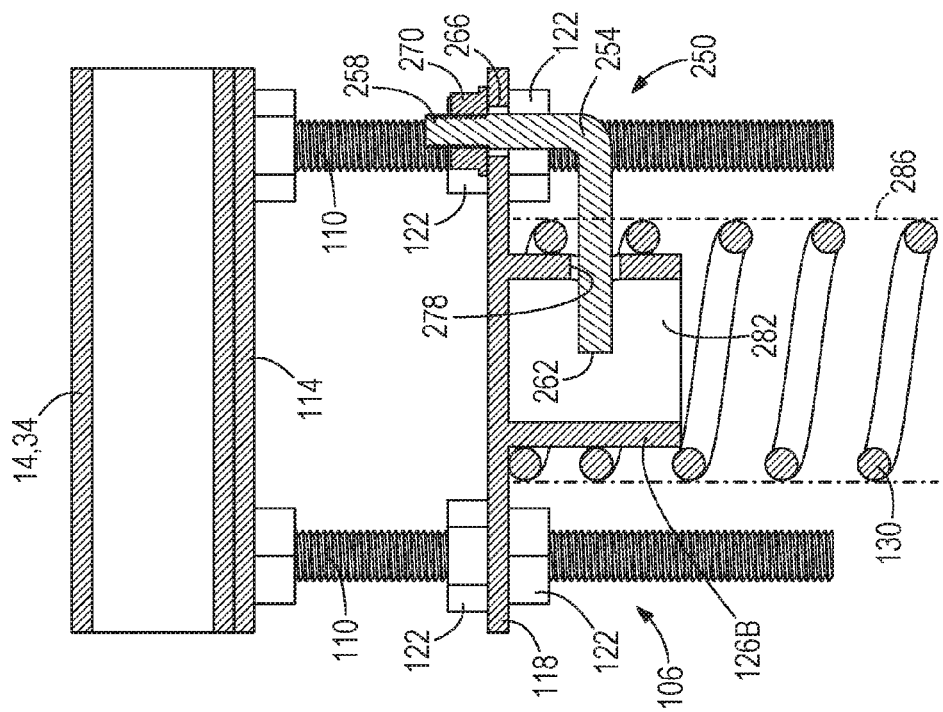
FIG. 6 is a partial cross-sectional view of the spring retainer of FIG. 5 taken along lines 6-6 of FIG. 5.
Figure 5:
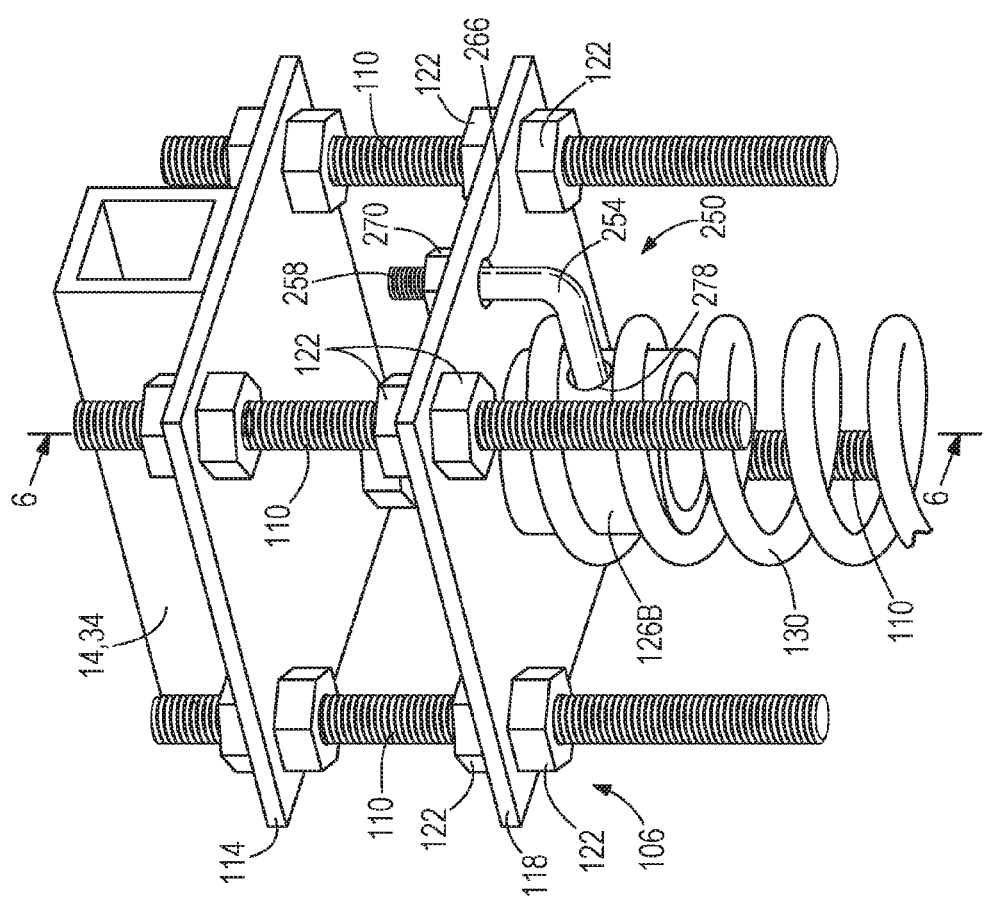
FIG. 5 is a bottom perspective view of a portion of a pressing assembly having a spring retainer according to another embodiment of the invention.

With reference to FIGS. 5 and 6, a spring retainer 250 according to second embodiment of the invention is illustrated. The spring retainer 250 includes a fastener 254 (e.g., a L-shaped bolt). The L-shaped bolt 254 includes a first end 258 coupled to the lower plate 118 of the spring support 106, and a second end 262 coupled to a cylindrical spring seat 126B. In other words, the L-shaped bolt 254 extends between the lower plate 118 and the cylindrical seat 126B. The cylindrical spring seat 126B is similar to the cylindrical spring seat 126 of FIGS. 1-4, except that the cylindrical spring seat 126B has a smaller diameter such that the spring 130 is positioned around the cylindrical spring seat 126B.

With continued reference to FIGS. 5 and 6, the first end 258 of the L-shaped bolt 254 is threaded and passes through a hole 266 formed in the lower plate 118. A corresponding nut 270 secures the first end 258 to the lower plate 118. The second end 262 passes through a hole 278 formed in the cylindrical spring seat 126B. In the illustrated embodiment, the hole 266 and the hole 278 are larger in diameter than the L-shaped bolt 254, such that the L-shaped bolt 254 can be assembled by, for example, inserting the second end 262 through the hole 278 first followed by inserting the first end through the hole 266. As such, the L-shaped bolt 254 extends into an interior space 282 (FIG. 6) defined by an outer periphery 286 of the spring 130. In other words, a portion of the L-shaped bolt 254 extends into the spring 130 (i.e., passes between coils of the spring). Similar to the spring retainer 150, the spring retainer 250 constrains the spring 130 to the location surrounding the spring support 106, securing the spring 130 to the remainder of the high angle conveyor 10.

With reference to FIGS. 7 and 8, a spring retainer 350 according to a third embodiment of the invention is illustrated. The spring retainer 350 includes a U-shaped bracket 354 having a first leg 358, a second leg 362, and an intermediate portion 366 extending between the first leg 358 and the second leg 362. The intermediate portion 366 of the U-shaped bracket 354 extends through the spring 130 and each of the first leg 358 and the second leg 362 are coupled to the cylindrical seat 126 of the spring support 106. In particular, fasteners 370 secure the first and second legs 358, 362 to the cylindrical seat 126. The intermediate portion 366 partially covers an opening 128 defined by the cylindrical support 126 in which the spring 130 is received. As such, once the spring retainer 350 is assembled, the spring 130 is secured to the spring support 106. Similar to the spring retainers 150, 250, the spring retainer 350 constrains the spring 130 to the location surrounding the spring support 106, securing the spring 130 to the remainder of the high angle conveyor 10.

With reference to FIGS. 9 and 10, a spring retainer 450 according to a fourth embodiment of the invention is illustrated. The spring retainer 450 includes a fastener 454 (i.e., a L-shaped bolt). The L-shaped bolt 454 includes a first end 458 coupled to the lower plate 118 of the spring support 106, and a second end 462 coupled to the cylindrical spring seat 126. In other words, the L-shaped bolt 545 extends between the lower plate 118 and the cylindrical seat 126. In the illustrated embodiment, the spring 130 is received within the cylindrical seat 126. The first end 458 of the L-shaped bolt 454 is threaded and passes through a hole 466 formed in the center of the lower plate 118. A corresponding nut 470 secures the first end 458 to the lower plate 118. The second end 462 passes through a hole 478 formed in the cylindrical spring seat 126. In the illustrated embodiment, the hole 466 and the hole 478 are larger in diameter than the L-shaped bolt 454 to facilitate assembly. As such, the L-shaped bolt 454 extends into an interior space 482 (FIG. 10) defined by an outer periphery 486 of the spring 130. In other words, a portion of the L-shaped bolt 454 extends into the spring 130 (i.e., passes between coils of the spring). Similar to the spring retainers 150, 250, 350, the spring retainer 450 constrains the spring 130 to the location surrounding the spring support 106, securing the spring 130 to the remainder of the high angle conveyor 10.

Various features and advantages of the invention are set forth in the following claims.

What is claimed is:

1. A high angle conveyor comprising:
   a frame;
   a lower conveyor belt;
   an upper conveyor belt; and
   a pressing assembly including
      a bracket coupled to the frame,
      a roller supported on the bracket,
      a spring positioned between the bracket and the frame, and
      a spring retainer including a cable coupling the spring to at least one selected from the group of the frame and the bracket;
   wherein the spring urges the bracket and the roller toward the upper conveyor belt such that the pressing assembly biases the upper conveyor belt toward the lower conveyor belt.

2. The high angle conveyor of claim 1, wherein the spring retainer further includes a first thimble at a first end of the cable and a second thimble at a second end of the cable.

3. The high angle conveyor of claim 2, wherein the spring retainer further includes an eye bolt coupled to the frame.

4. The high angle conveyor of claim 3, wherein the first thimble is coupled to the spring and the second thimble is coupled to the eye bolt.

5. The high angle conveyor of claim 1, wherein the cable includes a first end coupled to the spring and a second end coupled to the frame.

6. The high angle conveyor of claim 1, wherein the cable includes a first end coupled to the spring and a second end coupled to the bracket.

7. The high angle conveyor of claim 1, wherein the pressing assembly further includes a spring support coupled to the frame, wherein the spring support includes a plate and a cylindrical seat coaxially aligned with the spring.

8. The high angle conveyor of claim 7, wherein the spring is positioned within the cylindrical seat.

9. The high angle conveyor of claim 7, wherein the spring is positioned around the cylindrical seat.

10. A pressing assembly for a conveyor comprising:
    a bracket supporting a roller;
    a spring support;
    a spring positioned between the bracket and the spring support; and
    a spring retainer coupling the spring to at least one selected from the group of the bracket, and the spring support;
    wherein the spring urges the bracket and the roller away from the spring support; and
    wherein the spring support includes a cylindrical seat and the spring retainer includes a bracket that extends through the spring and is coupled to the cylindrical seat.

11. The high angle conveyor of claim 10, wherein the bracket of the spring retainer includes a first leg, a second leg, and an intermediate portion extending between the first leg and the second leg.

12. The high angle conveyor of claim 11, wherein the intermediate portion of the bracket extends through the spring, and the first leg and the second leg are coupled to the cylindrical seat of the spring support.

13. A high angle conveyor comprising:
    a frame;
    a lower conveyor belt;
    an upper conveyor belt; and
    a pressing assembly including
       a bracket coupled to the frame,
       a roller supported on the bracket,
       a spring positioned between the bracket and the frame, and
       a spring retainer including a fastener coupling the spring to at least one selected from the group of the frame and the bracket;
    wherein the spring urges the bracket and the roller toward the upper conveyor belt such that the pressing assembly biases the upper conveyor belt toward the lower conveyor belt.

14. The high angle conveyor of claim 13, wherein the pressing assembly further includes a spring support coupled to the frame, wherein the spring support includes a plate and a cylindrical seat coaxially aligned with the spring.

15. The high angle conveyor of claim 14, wherein the fastener extends between the plate and the cylindrical seat.

16. The high angle conveyor of claim 13, wherein the fastener extends into an interior space defined by an outer periphery of the spring.

* * * * *